United States Patent
Miller et al.

(10) Patent No.: US 12,079,498 B2
(45) Date of Patent: Sep. 3, 2024

(54) ALLOWING ACCESS TO A PARTIALLY REPLICATED DATASET

(71) Applicant: PURE STORAGE, INC., Mountain View, CA (US)

(72) Inventors: Ethan L. Miller, Santa Cruz, CA (US); John Colgrove, Los Altos, CA (US); Christopher Golden, Emerald Hills, CA (US); Steve Hodgson, Cobham (GB); Malcolm Sharpe, Mountain View, CA (US)

(73) Assignee: PURE STORAGE, INC., Santa Clara, CA (US)

( * ) Notice: Subject to any disclaimer, the term of this patent is extended or adjusted under 35 U.S.C. 154(b) by 90 days.

(21) Appl. No.: 17/823,968

(22) Filed: Sep. 1, 2022

(65) Prior Publication Data
US 2022/0413703 A1 Dec. 29, 2022

Related U.S. Application Data

(63) Continuation of application No. 17/070,036, filed on Oct. 14, 2020, now Pat. No. 11,442,640, which is a
(Continued)

(51) Int. Cl.
*G06F 12/00* (2006.01)
*G06F 3/06* (2006.01)
(Continued)

(52) U.S. Cl.
CPC ............ *G06F 3/064* (2013.01); *G06F 3/0604* (2013.01); *G06F 3/065* (2013.01); *G06F 3/0683* (2013.01);
(Continued)

(58) Field of Classification Search
None
See application file for complete search history.

(56) References Cited

U.S. PATENT DOCUMENTS

| | | |
|---|---|---|
| 5,208,813 A | 5/1993 | Stallmo |
| 5,403,639 A | 4/1995 | Belsan et al. |

(Continued)

FOREIGN PATENT DOCUMENTS

| | | |
|---|---|---|
| CN | 103370685 A | 10/2013 |
| CN | 103370686 A | 10/2013 |

(Continued)

OTHER PUBLICATIONS

Microsoft Corporation, "Fundamentals of Garbage Collection", Retrieved Aug. 30, 2013 via the WayBack Machine, 11 pages.
(Continued)

*Primary Examiner* — Daniel D Tsui

(57) ABSTRACT

A system, apparatus, and product for allowing access to a partially replicated dataset, including: detecting, by a target storage system, that a dataset will be replicated from a source storage system to the target storage system; exposing, by the target storage system, the dataset for user operations prior to receiving the entire dataset; receiving, by the target storage system, a request to read a portion of the dataset that has not been received by the target storage system; and retrieving, by the target storage system, the portion of the dataset.

18 Claims, 11 Drawing Sheets

Related U.S. Application Data continuation of application No. 16/161,747, filed on Oct. 16, 2018, now Pat. No. 10,838,640, which is a continuation of application No. 15/339,524, filed on Oct. 31, 2016, now Pat. No. 10,114,574, which is a continuation of application No. 14/508,683, filed on Oct. 7, 2014, now Pat. No. 9,489,132.

(51) Int. Cl.
*G06F 11/20* (2006.01)
*G06F 12/02* (2006.01)
*G06F 12/1009* (2016.01)

(52) U.S. Cl.
CPC ........ *G06F 3/0688* (2013.01); *G06F 11/2094* (2013.01); *G06F 12/0246* (2013.01); *G06F 12/1009* (2013.01); *G06F 2212/1056* (2013.01); *G06F 2212/214* (2013.01); *G06F 2212/7201* (2013.01)

(56) References Cited

U.S. PATENT DOCUMENTS

| | | |
|---|---|---|
| 5,706,210 A | 1/1998 | Kumano et al. |
| 5,799,200 A | 8/1998 | Brant et al. |
| 5,933,598 A | 8/1999 | Scales et al. |
| 5,940,838 A | 8/1999 | Schmuck et al. |
| 6,012,032 A | 1/2000 | Donovan et al. |
| 6,085,333 A | 7/2000 | DeKoning et al. |
| 6,263,350 B1 | 7/2001 | Wollrath et al. |
| 6,412,045 B1 | 6/2002 | DeKoning et al. |
| 6,643,641 B1 | 11/2003 | Snyder |
| 6,647,514 B1 | 11/2003 | Umberger et al. |
| 6,718,448 B1 | 4/2004 | Ofer |
| 6,757,769 B1 | 6/2004 | Ofer |
| 6,789,162 B1 | 9/2004 | Talagala et al. |
| 6,799,283 B1 | 9/2004 | Tamai et al. |
| 6,834,298 B1 | 12/2004 | Singer et al. |
| 6,850,938 B1 | 2/2005 | Sadjadi |
| 6,915,434 B1 | 7/2005 | Kuroda et al. |
| 6,973,549 B1 | 12/2005 | Testardi |
| 7,028,216 B2 | 4/2006 | Aizawa et al. |
| 7,028,218 B2 | 4/2006 | Schwarm et al. |
| 7,039,827 B2 | 5/2006 | Meyer et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,216,164 B1 | 5/2007 | Whitmore et al. |
| 7,334,124 B2 | 2/2008 | Pham et al. |
| 7,437,530 B1 | 10/2008 | Rajan |
| 7,493,424 B1 | 2/2009 | Bali et al. |
| 7,543,121 B2 | 6/2009 | Maki et al. |
| 7,669,029 B1 | 2/2010 | Mishra et al. |
| 7,689,609 B2 | 3/2010 | Lango et al. |
| 7,743,191 B1 | 6/2010 | Liao |
| 7,783,682 B1 | 8/2010 | Patterson |
| 7,873,619 B1 | 1/2011 | Faibish et al. |
| 7,899,780 B1 | 3/2011 | Shmuylovich et al. |
| 7,913,300 B1 | 3/2011 | Flank et al. |
| 7,933,936 B2 | 4/2011 | Aggarwal et al. |
| 7,975,115 B2 | 7/2011 | Wayda et al. |
| 7,979,613 B2 | 7/2011 | Zohar et al. |
| 8,042,163 B1 | 10/2011 | Karr et al. |
| 8,086,585 B1 | 12/2011 | Brashers et al. |
| 8,086,652 B1 | 12/2011 | Bisson et al. |
| 8,117,464 B1 | 2/2012 | Kogelnik |
| 8,190,565 B2 | 5/2012 | Prahlad et al. |
| 8,200,887 B2 | 6/2012 | Bennett |
| 8,205,065 B2 | 6/2012 | Matze |
| 8,271,700 B1 | 9/2012 | Annem et al. |
| 8,352,540 B2 | 1/2013 | Anglin et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,504,797 B2 | 8/2013 | Mimatsu |
| 8,527,544 B1 | 9/2013 | Colgrove et al. |
| 8,560,747 B1 | 10/2013 | Tan et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,621,241 B1 | 12/2013 | Stephenson |
| 8,700,875 B1 | 4/2014 | Barron et al. |
| 8,751,463 B1 | 6/2014 | Chamness |
| 8,762,642 B2 | 6/2014 | Bates et al. |
| 8,769,622 B2 | 7/2014 | Chang et al. |
| 8,800,009 B1 | 8/2014 | Beda, III et al. |
| 8,806,160 B2 | 8/2014 | Colgrove et al. |
| 8,812,860 B1 | 8/2014 | Bray |
| 8,822,155 B2 | 9/2014 | Sukumar et al. |
| 8,850,546 B1 | 9/2014 | Field et al. |
| 8,874,850 B1 | 10/2014 | Goodson et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,959,305 B1 | 2/2015 | LeCrone et al. |
| 8,984,602 B1 | 3/2015 | Bailey et al. |
| 8,990,905 B1 | 3/2015 | Bailey et al. |
| 9,081,713 B1 | 7/2015 | Bennett |
| 9,124,569 B2 | 9/2015 | Hussain et al. |
| 9,134,922 B2 | 9/2015 | Rajagopal et al. |
| 9,189,334 B2 | 11/2015 | Bennett |
| 9,209,973 B2 | 12/2015 | Aikas et al. |
| 9,250,823 B1 | 2/2016 | Kamat et al. |
| 9,280,678 B2 | 3/2016 | Redberg |
| 9,300,660 B1 | 3/2016 | Borowiec et al. |
| 9,311,182 B2 | 4/2016 | Bennett |
| 9,395,922 B2 | 7/2016 | Nishikido et al. |
| 9,423,967 B2 | 8/2016 | Colgrove et al. |
| 9,436,396 B2 | 9/2016 | Colgrove et al. |
| 9,436,720 B2 | 9/2016 | Colgrove et al. |
| 9,444,822 B1 | 9/2016 | Borowiec et al. |
| 9,454,476 B2 | 9/2016 | Colgrove et al. |
| 9,454,477 B2 | 9/2016 | Colgrove et al. |
| 9,489,132 B2 | 11/2016 | Golden et al. |
| 9,507,532 B1 | 11/2016 | Colgrove et al. |
| 9,513,820 B1 | 12/2016 | Shalev |
| 9,516,016 B2 | 12/2016 | Colgrove et al. |
| 9,552,248 B2 | 1/2017 | Miller et al. |
| 9,632,870 B2 | 4/2017 | Bennett |
| 10,114,574 B1 | 10/2018 | Golden et al. |
| 10,324,639 B2 | 6/2019 | Seo |
| 10,567,406 B2 | 2/2020 | Astigarraga et al. |
| 10,838,640 B1 | 11/2020 | Golden et al. |
| 10,846,137 B2 | 11/2020 | Vallala et al. |
| 10,877,683 B2 | 12/2020 | Wu et al. |
| 11,076,509 B2 | 7/2021 | Alissa et al. |
| 11,106,810 B2 | 8/2021 | Natanzon et al. |
| 11,194,707 B2 | 12/2021 | Stalzer |
| 2002/0013802 A1 | 1/2002 | Mori et al. |
| 2002/0038436 A1 | 3/2002 | Suzuki |
| 2002/0087544 A1 | 7/2002 | Selkirk et al. |
| 2002/0178335 A1 | 11/2002 | Selkirk et al. |
| 2003/0140209 A1 | 7/2003 | Testardi |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0049572 A1 | 3/2004 | Yamamoto et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0066095 A1 | 3/2005 | Mullick et al. |
| 2005/0138312 A1* | 6/2005 | Kubo ............. G06F 11/1466 711/162 |
| 2005/0160416 A1 | 7/2005 | Jamison |
| 2005/0188246 A1 | 8/2005 | Emberty et al. |
| 2005/0216535 A1 | 9/2005 | Saika et al. |
| 2005/0216800 A1 | 9/2005 | Bicknell et al. |
| 2005/0223154 A1 | 10/2005 | Uemura |
| 2006/0015771 A1 | 1/2006 | Van Gundy et al. |

(56) References Cited

U.S. PATENT DOCUMENTS

| | | |
|---|---|---|
| 2006/0074940 A1 | 4/2006 | Craft et al. |
| 2006/0129817 A1 | 6/2006 | Borneman et al. |
| 2006/0136365 A1 | 6/2006 | Kedem et al. |
| 2006/0155946 A1 | 7/2006 | Ji |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0067585 A1 | 3/2007 | Ueda et al. |
| 2007/0109856 A1 | 5/2007 | Pellicone et al. |
| 2007/0150689 A1 | 6/2007 | Pandit et al. |
| 2007/0162954 A1 | 7/2007 | Pela |
| 2007/0168321 A1 | 7/2007 | Saito et al. |
| 2007/0171562 A1 | 7/2007 | Maejima et al. |
| 2007/0174673 A1 | 7/2007 | Kawaguchi et al. |
| 2007/0220227 A1 | 9/2007 | Long |
| 2007/0220313 A1 | 9/2007 | Katsuragi et al. |
| 2007/0245090 A1 | 10/2007 | King et al. |
| 2007/0266179 A1 | 11/2007 | Chavan et al. |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0059699 A1 | 3/2008 | Kubo et al. |
| 2008/0065852 A1 | 3/2008 | Moore et al. |
| 2008/0077825 A1 | 3/2008 | Bello et al. |
| 2008/0134174 A1 | 6/2008 | Sheu et al. |
| 2008/0155191 A1 | 6/2008 | Anderson et al. |
| 2008/0162674 A1 | 7/2008 | Dahiya |
| 2008/0178040 A1 | 7/2008 | Kobayashi |
| 2008/0195833 A1 | 8/2008 | Park |
| 2008/0209096 A1 | 8/2008 | Lin et al. |
| 2008/0244205 A1 | 10/2008 | Amano et al. |
| 2008/0256141 A1 | 10/2008 | Wayda et al. |
| 2008/0270678 A1 | 10/2008 | Cornwell et al. |
| 2008/0275928 A1 | 11/2008 | Shuster |
| 2008/0282045 A1 | 11/2008 | Biswas et al. |
| 2008/0285083 A1 | 11/2008 | Aonuma |
| 2008/0307270 A1 | 12/2008 | Li |
| 2009/0006587 A1 | 1/2009 | Richter |
| 2009/0037662 A1 | 2/2009 | La Frese et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2009/0204858 A1 | 8/2009 | Kawaba |
| 2009/0228648 A1 | 9/2009 | Wack |
| 2009/0300084 A1 | 12/2009 | Whitehouse |
| 2010/0052625 A1 | 3/2010 | Cagno et al. |
| 2010/0057673 A1 | 3/2010 | Savov |
| 2010/0058026 A1 | 3/2010 | Heil et al. |
| 2010/0067706 A1 | 3/2010 | Anan et al. |
| 2010/0077205 A1 | 3/2010 | Ekstrom et al. |
| 2010/0082879 A1 | 4/2010 | McKean et al. |
| 2010/0106905 A1 | 4/2010 | Kurashige et al. |
| 2010/0153620 A1 | 6/2010 | McKean et al. |
| 2010/0153641 A1 | 6/2010 | Jagadish et al. |
| 2010/0191897 A1 | 7/2010 | Zhang et al. |
| 2010/0211723 A1 | 8/2010 | Mukaida |
| 2010/0246266 A1 | 9/2010 | Park et al. |
| 2010/0250802 A1 | 9/2010 | Waugh et al. |
| 2010/0250882 A1 | 9/2010 | Hutchison et al. |
| 2010/0257142 A1 | 10/2010 | Murphy et al. |
| 2010/0262764 A1 | 10/2010 | Liu et al. |
| 2010/0281225 A1 | 11/2010 | Chen et al. |
| 2010/0287327 A1 | 11/2010 | Li et al. |
| 2010/0306500 A1 | 12/2010 | Mimatsu |
| 2010/0325345 A1 | 12/2010 | Ohno et al. |
| 2010/0332754 A1 | 12/2010 | Lai et al. |
| 2011/0035540 A1 | 2/2011 | Fitzgerald et al. |
| 2011/0072290 A1 | 3/2011 | Davis et al. |
| 2011/0072300 A1 | 3/2011 | Rousseau |
| 2011/0125955 A1 | 5/2011 | Chen |
| 2011/0131231 A1 | 6/2011 | Haas et al. |
| 2011/0145598 A1 | 6/2011 | Smith et al. |
| 2011/0161559 A1 | 6/2011 | Yurzola et al. |
| 2011/0167221 A1 | 7/2011 | Pangal et al. |
| 2011/0238634 A1 | 9/2011 | Kobara |
| 2012/0023144 A1 | 1/2012 | Rub |
| 2012/0023375 A1 | 1/2012 | Dutta et al. |
| 2012/0036309 A1 | 2/2012 | Dillow et al. |
| 2012/0054264 A1 | 3/2012 | Haugh et al. |
| 2012/0079318 A1 | 3/2012 | Colgrove et al. |
| 2012/0117029 A1 | 5/2012 | Gold |
| 2012/0131253 A1 | 5/2012 | McKnight et al. |
| 2012/0198175 A1 | 8/2012 | Atkisson |
| 2012/0233434 A1 | 9/2012 | Starks et al. |
| 2012/0303919 A1 | 11/2012 | Hu et al. |
| 2012/0311000 A1 | 12/2012 | Post et al. |
| 2012/0330954 A1 | 12/2012 | Sivasubramanian et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0042052 A1 | 2/2013 | Colgrove et al. |
| 2013/0046995 A1 | 2/2013 | Movshovitz |
| 2013/0047029 A1 | 2/2013 | Ikeuchi et al. |
| 2013/0071087 A1 | 3/2013 | Motiwala et al. |
| 2013/0091102 A1 | 4/2013 | Nayak |
| 2013/0145447 A1 | 6/2013 | Maron |
| 2013/0191555 A1 | 7/2013 | Liu |
| 2013/0198459 A1 | 8/2013 | Joshi et al. |
| 2013/0205110 A1 | 8/2013 | Kettner |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0227236 A1 | 8/2013 | Flynn et al. |
| 2013/0275391 A1 | 10/2013 | Batwara et al. |
| 2013/0275656 A1 | 10/2013 | Talagala et al. |
| 2013/0283058 A1 | 10/2013 | Fiske et al. |
| 2013/0290607 A1 | 10/2013 | Chang et al. |
| 2013/0290648 A1 | 10/2013 | Shao et al. |
| 2013/0311434 A1 | 11/2013 | Jones |
| 2013/0318297 A1 | 11/2013 | Jibbe et al. |
| 2013/0318314 A1 | 11/2013 | Markus et al. |
| 2013/0332614 A1 | 12/2013 | Brunk et al. |
| 2013/0339303 A1 | 12/2013 | Potter et al. |
| 2014/0020083 A1 | 1/2014 | Fetik |
| 2014/0052946 A1 | 2/2014 | Kimmel |
| 2014/0068791 A1 | 3/2014 | Resch |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0089730 A1 | 3/2014 | Watanabe et al. |
| 2014/0090009 A1 | 3/2014 | Li et al. |
| 2014/0096220 A1 | 4/2014 | Da Cruz Pinto et al. |
| 2014/0101361 A1 | 4/2014 | Gschwind |
| 2014/0101434 A1 | 4/2014 | Senthurpandi et al. |
| 2014/0143517 A1 | 5/2014 | Jin et al. |
| 2014/0164774 A1 | 6/2014 | Nord et al. |
| 2014/0172929 A1 | 6/2014 | Sedayao et al. |
| 2014/0173232 A1 | 6/2014 | Reohr et al. |
| 2014/0195636 A1 | 7/2014 | Karve et al. |
| 2014/0201150 A1 | 7/2014 | Kumarasamy et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215129 A1 | 7/2014 | Kuzmin et al. |
| 2014/0215590 A1 | 7/2014 | Brand |
| 2014/0220561 A1 | 8/2014 | Sukumar et al. |
| 2014/0229131 A1 | 8/2014 | Cohen et al. |
| 2014/0229452 A1 | 8/2014 | Serita et al. |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0281308 A1 | 9/2014 | Lango et al. |
| 2014/0282983 A1 | 9/2014 | Ju et al. |
| 2014/0285917 A1 | 9/2014 | Cudak et al. |
| 2014/0325115 A1 | 10/2014 | Ramsundar et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |

(56) References Cited

U.S. PATENT DOCUMENTS

| | | |
|---|---|---|
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0154418 A1 | 6/2015 | Redberg |
| 2015/0193169 A1 | 7/2015 | Sundaram et al. |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2015/0378888 A1 | 12/2015 | Zhang et al. |
| 2016/0019114 A1 | 1/2016 | Han et al. |
| 2016/0026397 A1 | 1/2016 | Nishikido et al. |
| 2016/0098191 A1 | 4/2016 | Golden et al. |
| 2016/0098199 A1 | 4/2016 | Golden et al. |
| 2016/0098323 A1 | 4/2016 | Mutha et al. |
| 2016/0182542 A1 | 6/2016 | Staniford |
| 2016/0248631 A1 | 8/2016 | Duchesneau |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |
| 2017/0262202 A1 | 9/2017 | Seo |
| 2018/0054454 A1 | 2/2018 | Astigarraga et al. |
| 2018/0081562 A1 | 3/2018 | Vasudevan |
| 2019/0220315 A1 | 7/2019 | Vallala et al. |
| 2020/0034560 A1 | 1/2020 | Natanzon et al. |
| 2020/0326871 A1 | 10/2020 | Wu et al. |
| 2021/0360833 A1 | 11/2021 | Alissa et al. |

FOREIGN PATENT DOCUMENTS

| | | |
|---|---|---|
| CN | 104025010 B | 11/2016 |
| EP | 0725324 A2 | 8/1996 |
| EP | 3066610 A1 | 9/2016 |
| EP | 3082047 A1 | 10/2016 |
| EP | 3120235 A | 1/2017 |
| JP | 2007087036 A | 4/2007 |
| JP | 2007094472 A | 4/2007 |
| JP | 2008250667 A | 10/2008 |
| JP | 2010211681 A | 9/2010 |
| WO | 1995002349 A1 | 1/1995 |
| WO | 1999013403 A1 | 3/1999 |
| WO | 2008102347 A1 | 8/2008 |
| WO | 2010071655 A1 | 6/2010 |
| WO | WO-2012087648 A2 | 6/2012 |
| WO | WO-2013071087 A1 | 5/2013 |
| WO | WO-2014110137 A1 | 7/2014 |
| WO | WO-2016015008 A1 | 1/2016 |
| WO | WO-2016190938 A1 | 12/2016 |
| WO | WO-2016195759 A1 | 12/2016 |
| WO | WO-2016195958 A1 | 12/2016 |
| WO | WO-2016195961 A1 | 12/2016 |

OTHER PUBLICATIONS

Microsoft Corporation, "GCSettings.IsServerGC Property", Retrieved Oct. 27, 2013 via the WayBack Machine, 3 pages.

Bellamy-McIntyre J., et al., "OpenID and the Enterprise: A Model-based Analysis of Single Sign-On Authentication," (online), 2011, 15th IEEE International Enterprise Distributed Object Computing Conference (EDOC), Dated Aug. 29, 2011, 10 pages, DOI:10.1109/EDOC.2011.26, Isbn: 978-1-4577-0362-1, Retrieved fromURL:https://www.cs.auckland.ac.nz/lutteroth/publications/McIntyreLutterothWeber2011-OpenID.pdf.

ETSI: "Network Function Virtualisation (NFV); Resiliency Requirements," ETSI GS NFV-REL 001, V1.1.1, etsi.org (Online), Jan. 2015, 82 Pages, Retrieved fromURL:www.etsi.org/deliver/etsi_gs/NFV-RELJ001_099/001/01.01.01_60/gs_NFV-REL001v010101p.pdf.

Faith R., "Dictzip File Format," GitHub.com (Online), 01 Page, [Accessed on Jul. 28, 2015] Retrieved from URL: github.com/fidlej/idzip.

Google Search of: "Storage Array Define, " Performed by the Examiner for U.S. Appl. No. 14/725,278 on Nov. 4, 2015 , Results Limited to Entries Dated before 2012, 01 Page.

Hota C., et al., "Capability-Based Cryptographic Data Access Control in Cloud Computing," International Journal of Advanced Networking and Applications, Eswar Publications, India, Aug. 13, 2011, vol. 1, No. 1,10 Pages.

Hu X-Y., et al., "Container Marking: Combining Data Placement, Garbage Collection and Wear Levelling for Flash," 19th Annual IEEE International Symposium on Modeling, Analysis, and Simulation of Computer and Telecommunications Systems, Jul. 25-27, 2011, 11 Pages, DOI: 10.1109/MASCOTS.2011.50, ISBN: 978-0-7695-4430-4.

Hwang K., et al., "RAID-x: A New Distributed Disk Array for I/O-Centric Cluster Computing," Proceedings of The Ninth International Symposium On High-performance Distributed Computing, IEEE Computer Society, Los Alamitos, CA, Aug. 2000, pp. 279-286.

International Search Report and Written Opinion for International Application No. PCT/US2016/015006, Apr. 29, 2016, 12 pages.

International Search Report and Written Opinion for International Application No. PCT/US2016/016333, Jun. 8, 2016, 12 pages.

International Search Report and Written Opinion for International Application No. PCT/US2016/020410, mailed Jul. 8, 2016, 17 pages.

International Search Report and Written Opinion for International Application No. PCT/US2016/032052, mailed Aug. 30, 2016, 17 Pages.

International Search Report and Written Opinion for International Application No. PCT/US2016/032084, mailed Jul. 18, 2016, 12 Pages.

International Search Report and Written Opinion for International Application No. PCT/US2016/035492, mailed Aug. 17, 2016, 10 pages.

International Search Report and Written Opinion for International Application No. PCT/US2016/036693, mailed Aug. 29, 2016, 10 Pages.

International Search Report and Written Opinion for International Application No. PCT/US2016/038758, mailed Oct. 7, 2016, 10 Pages.

International Search Report and Written Opinion for International Application No. PCT/US2016/040393, mailed Sep. 22, 2016, 10 Pages.

International Search Report and Written Opinion for International Application No. PCT/US2016/044020, mailed Sep. 30, 2016, 11 Pages.

International Search Report and Written Opinion for International Application No. PCT/US2016/044874, mailed Oct. 7, 2016, 11 Pages.

International Search Report and Written Opinion for International Application No. PCT/US2016/044875, mailed Oct. 5, 2016, 13 pages.

International Search Report and Written Opinion for International Application No. PCT/US2016/044876, mailed Oct. 21, 2016, 12 Pages.

International Search Report and Written Opinion for International Application No. PCT/US2016/044877, mailed Sep. 29, 2016, 13 pages.

International Search Report and Written Opinion of the International Application No. PCT/US2016/015008, mailed May 4, 2016, 12 pages.

Kong K., "Using PCI Express as the Primary System Interconnect in Multiroot Compute, Storage, Communications and Embedded Systems," IDT, White Paper, Aug. 28, 2008, 12 Pages, [Retrieved by WIPO on Dec. 1, 2014] Retrieved from URL: http://www.idt.com/document/whp/idt-pcie-multi-root-white-paper.

Li J., et al., "Access Control for the Services Oriented Architecture," Proceedings of the ACM Workshop on Secure Web Services (SWS), ACM, New York, Nov. 2, 2007, pp. 9-17.

(56) References Cited

OTHER PUBLICATIONS

Microsoft: "Hybrid for SharePoint Server 2013—Security Reference Architecture," Oct. 1, 2014, pp. 1-53, XP055296534, [Retrieved On Aug. 19, 2016] Retrieved from URL: http://hybrid.office.com/img/Security_Reference_Architecture.pdf.
Microsoft, "Hybrid Identity Management", Microsoft (online), Apr. 2014, 2 pages, URL: download.microsoft.com/ download/E/A/E/EAE57CD1-A80B-423C-96BB-142FAAC630B9/Hybrid_Identity_Datasheet.pdf.
Microsoft, "Hybrid Identity," (online), Dated Apr. 2014, 36 pages, Retrieved from URL: http://aka.ms/HybridIdentityWp.
PCMAG: "Storage Array Definition," Published May 10, 2013, 1 page, Retrieved from URL: http://web.archive.Org/web/20130510121646/http://www.pcmag.com/encyclopedia/term/52091/storage-array.
Stalzer M.A., "FlashBlades: System Architecture and Applications," Proceedings of the 2nd Workshop on Architectures and Systems for Big Data, Association for Computing Machinery, New York, NY, 2012, pp. 10-14.
Storer M.W., et al., "Secure Data Deduplication," Proceedings of the 4th ACM International Workshop on Storage Security And Survivability (StorageSS'08), ACM New York, NY, USA, Oct. 31, 2008, 10 Pages, DOI: 10.1145/1456471.
Storer M.W., et al., "Pergamum: Replacing Tape with Energy Efficient, Reliable, Disk-Based Archival Storage," 6th Usenix Conference on File And Storage Technologies (FAST'08), San Jose, CA, USA, Feb. 26-29, 2008, 16 Pages, ISBN 978-1-931971-56-0, XP002665467.
Sweere P., "Creating Storage Class Persistent Memory with NVDIMM," Flash Memory Summit, Aug. 2013, 22 Pages, Retrieved from URL: http://www.flashmemorysummit.com/English/Collaterals/Proceedings/2013/20130814_T2_Sweere. pdf.
Techopedia, "What is a Disk Array," techopedia.com (online), Jan. 13, 2012, 1 Page, Retrieved from URL: https://web.archive.org/web/20120113053358/http://www.techopedia.com/definition/1009/disk-array.
Webopedia, "What is a disk array," webopedia.com (online), May 26, 2011, 2 Pages, Retrieved from URL: https://web/archive.org/web/20110526081214/http://www.webopedia.com/TERM/D/disk_array.html.
Wikipedia, "Convergent Encryption," Wikipedia.org (online), Accessed on Sep. 8, 2015, 2 pages, Retrieved from URL: en.wikipedia.org/wiki/Convergent_encryption.

\* cited by examiner

ALLOWING ACCESS TO A PARTIALLY REPLICATED DATASET

CROSS REFERENCE TO RELATED APPLICATIONS

This is a continuation application for patent entitled to a filing date and claiming the benefit of earlier-filed U.S. Pat. No. 11,442,640, issued Sep. 13, 2022, herein incorporated by reference in its entirety, which is a continuation of U.S. Pat. No. 10,838,640, issued Nov. 17, 2020, which is a continuation of U.S. Pat. No. 10,114,574, issued Oct. 30, 2018, which is a continuation of U.S. Pat. No. 9,489,132, issued Nov. 8, 2016.

BACKGROUND

Technical Field

Embodiments described herein relate to storage systems, and more particularly, to techniques for using unmapped and unknown states in a storage system.

Description of the Related Art

Various applications executing on a computer system may store and access data stored on one or more storage devices of a storage system. As the data is modified over time, the storage system needs to keep track of the changes, update mappings, and free up storage locations corresponding to deleted data so that these storage locations can be used for new data. However, tracking changes can be challenging as the complexity of mappings increases for the various datasets in use for a plurality of users. In addition, replicating a dataset from one storage system to another storage system can be challenging as the dataset changes over time and the metadata and/or mappings of the dataset are in a state of flux. Therefore, efficient techniques for maintaining and replicating datasets in a storage system are desired.

SUMMARY

Various embodiments of systems and methods for utilizing unmapped and unknown states in a storage system are contemplated.

In one embodiment, a storage system may include one or more storage subsystems, with each storage subsystem including a storage controller and one or more storage devices. In one embodiment, the storage controller may utilize volumes and mediums to track stored client data. In various embodiments, each volume may be mapped to a single anchor medium, and the anchor medium for a given volume may be mapped to any number of levels of underlying mediums in a medium hierarchy for the given volume. A medium may be defined as a logical grouping of data. In various embodiments, a medium below an anchor medium may generally correspond to a previously taken snapshot of the volume. When a snapshot is taken of a volume, the existing anchor medium which is made stable as a result of the snapshot may be referred to as a parent medium and a new anchor medium which is created for the volume may be referred to as a child medium.

In one embodiment, a common parent medium may have multiple different child(ren) mediums on separate storage subsystems. For example, a first subsystem may include a first child medium of a first parent medium, and a second subsystem may include a second child medium of the first parent medium. The contents of the first parent medium may be different on the first subsystem and second subsystem if the first and second child mediums have different visibility into the first parent medium. The different visibility into the parent medium may be caused by different patterns of overwrites to the first child and second child mediums. For example, a first portion of the first parent medium may have been freed up on the first subsystem while a second portion of the first parent medium may have been freed up on the second subsystem, wherein the first portion is different from the second portion. The portions of the first parent medium which have been freed up on the first and second subsystems may be marked as unmapped so that the corresponding storage locations can be freed up during garbage collection. The unmapped state indicates that the contents of these portions have been forgotten by the host subsystem.

If the first parent medium is replicated from the first storage subsystem to a third storage subsystem, the first portion of the first parent medium may be converted from the unmapped state to an unknown state. Then at a later point in time, if the first parent medium is replicated from the second subsystem to the third storage subsystem, and if the second subsystem still has the first portion of the first parent medium, the second subsystem may overwrite the first portion of the first parent medium on the third storage subsystem. The different copies of the parent medium which are stored on different subsystems may have the same global content ID so that the third subsystem is able to consolidate the parent medium's contents from the first and second subsystems.

These and other embodiments will become apparent upon consideration of the following description and accompanying drawings.

Figure 1:
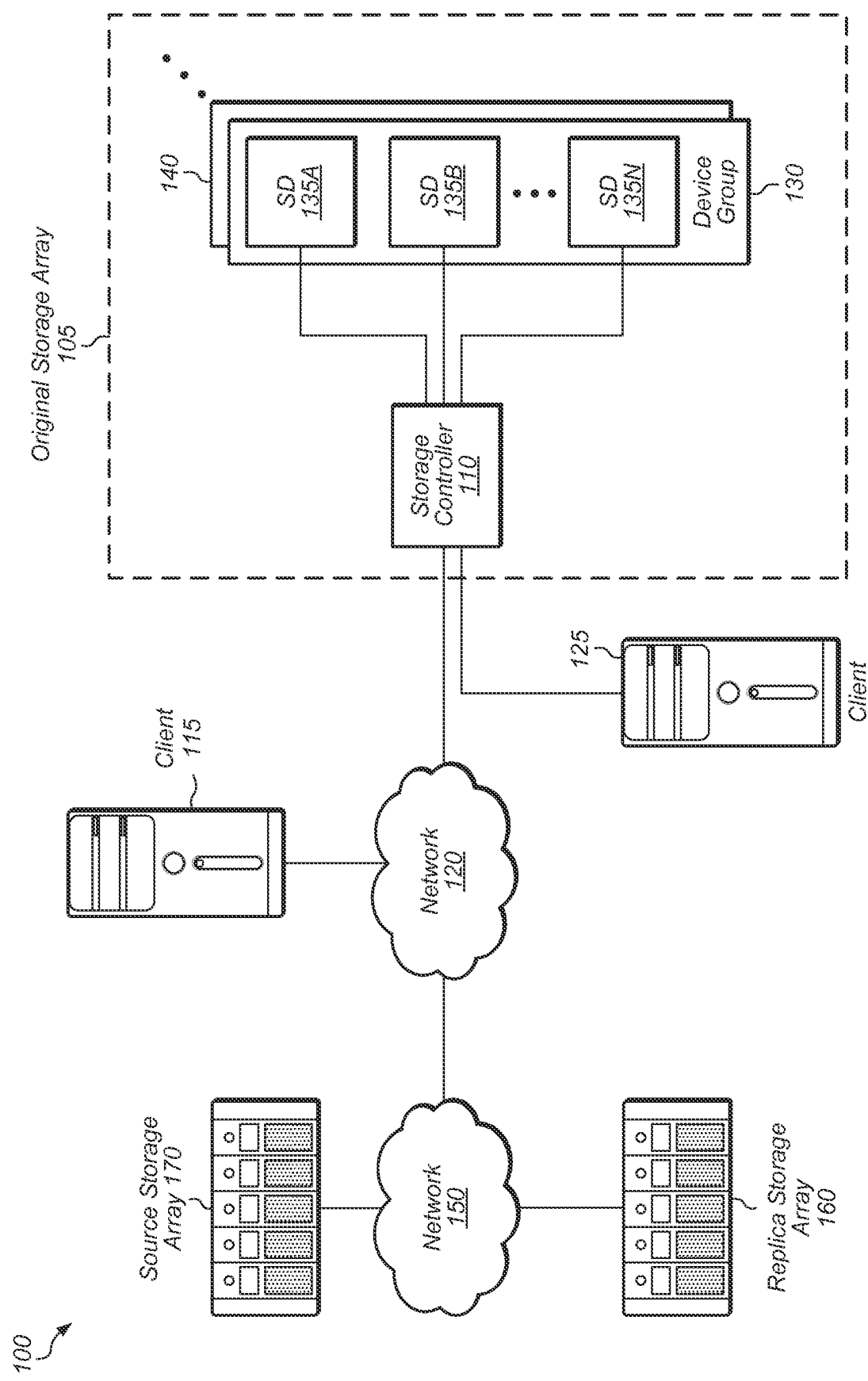
FIG. 1 is a generalized block diagram illustrating one embodiment of a storage system.

While the methods and mechanisms described herein are susceptible to various modifications and alternative forms, specific embodiments are shown by way of example in the drawings and are herein described in detail. It should be understood, however, that drawings and detailed description thereto are not intended to limit the methods and mechanisms to the particular form disclosed, but on the contrary, are intended to cover all modifications, equivalents and alternatives apparent to those skilled in the art once the disclosure is fully appreciated.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a storage controller . . . ." Such a claim does not foreclose the system from including additional components (e.g., a network, a server, a display device).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a generalized block diagram of one embodiment of a storage system 100 is shown. Storage system 100 may include original storage array 105, replica storage array 160, and source storage array 170. Original storage array 105 may include storage controller 110 and storage device groups 130 and 140, which are representative of any number of storage device groups. Although not shown in FIG. 1, replica storage array 160 and source storage array 170 may also include one or more storage controllers and one or more storage device groups. It is noted that storage arrays 105, 160, and 170 may also be referred to as storage subsystems or storage systems.

As shown, storage device group 130 includes storage devices 135A-N, which are representative of any number and type of storage devices (e.g., solid-state drives (SSDs)). Storage controller 110 may be coupled directly to client computer system 125, and storage controller 110 may be coupled remotely over network 120 to client computer system 115. Clients 115 and 125 are representative of any number of clients which may utilize storage controller 110 for storing and accessing data in system 100. It is noted that some systems may include only a single client, connected directly or remotely to storage controller 110. It is also noted that original storage array 105 may include more than one storage controller in some embodiments.

Storage controller 110 may include software and/or hardware configured to provide access to storage devices 135A-N. Although storage controller 110 is shown as being separate from storage device groups 130 and 140, in some embodiments, storage controller 110 may be located within one or each of storage device groups 130 and 140. Storage controller 110 may include or be coupled to a base operating system (OS), a volume manager, and additional control logic for implementing the various techniques disclosed herein.

Storage controller 110 may include and/or execute on any number of processors and may include and/or execute on a single host computing device or be spread across multiple host computing devices, depending on the embodiment. In some embodiments, storage controller 110 may generally include or execute on one or more file servers and/or block servers. Storage controller 110 may use any of various techniques for replicating data across devices 135A-N to prevent loss of data due to the failure of a device or the failure of storage locations within a device. Storage controller 110 may also utilize any of various deduplication techniques for reducing the amount of data stored in devices 135A-N by deduplicating common data segments.

Storage controller 110 may be configured to create and manage mediums in system 100. Accordingly, a set of mediums may be recorded and maintained by storage controller 110. The term "medium" as is used herein is defined as a logical grouping of data. A medium may have a corresponding identifier with which to identify the logical grouping of data. Each medium may also include or be associated with mappings of logical block numbers to content location, deduplication entries, and other information. In one embodiment, medium identifiers may be used by the storage controller but medium identifiers may not be user-visible. A user (or client) may send a data request accompanied by a volume ID to specify which data is targeted by the request, and the storage controller may map the volume ID to a medium ID and then use the medium ID when processing the request.

A medium may be virtual such that it is identified by a unique ID, and all blocks stored to a volume while the corresponding medium is open for writing may be recorded as <medium, block number>. Each medium logically comprises all of the blocks in the medium. However, only the blocks that were written to the medium from the time the medium was created to the time the medium was closed are recorded and mappings to these blocks may also be maintained with the medium.

The term "medium" is not to be confused with the terms "storage medium" or "computer readable storage medium". A storage medium is defined as an actual physical device (e.g., SSD, HDD) that is utilized to store data. A computer readable storage medium (or non-transitory computer readable storage medium) is defined as a physical storage medium configured to store program instructions which are executable by a processor or other hardware device. Various types of program instructions that implement the methods and/or mechanisms described herein may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, multiple mapping tables may be maintained by storage controller 110. These mapping tables may include a medium mapping table, a volume-to-medium mapping table, an address translation table, a deduplication table, an overlay table, and/or other tables. In some embodiments, the information stored in two or more of these tables may be combined into a single table. The medium mapping table may be utilized to record and maintain the mappings between mediums and underlying mediums and the volume-to-medium mapping table may be utilized to record and maintain the mappings between volumes and anchor mediums. In one embodiment, a volume may be mapped to an anchor medium which is in a read-write state. The anchor medium may then be mapped to any number of underlying mediums (or portions of mediums) in the medium mapping table. A sector or other portion of a medium may be referred to as "underlying" a volume if the sector or portion of the medium is included within the volume. In other words, a given sector of a medium may "underlie" a volume if the anchor medium of the volume maps to the given sector.

The address translation table may include a plurality of entries, with each entry holding a virtual-to-physical mapping for a corresponding data component. This mapping table may be used to map logical read/write requests from each of the client computer systems 115 and 125 to physical locations in storage devices 135A-N. A "physical" pointer value may be read from the mappings associated with a given medium or snapshot during a lookup operation corresponding to a received read/write request. This physical pointer value may then be used to locate a physical location within the storage devices 135A-N. It is noted that the physical pointer value may be used to access another mapping table within a given storage device of the storage devices 135A-N. Consequently, one or more levels of indirection may exist between the physical pointer value and a target storage location.

In various embodiments, the address translation table may be accessed using a key comprising a medium or snapshot ID, a logical or virtual address, a sector number, and so forth.

A received read/write storage access request may identify a particular volume, sector, and length. The volume ID may be mapped to a medium or snapshot ID using the volume to medium mapping table. A sector may be a logical block of data stored in a medium, with a sector being the smallest size of an atomic I/O request to the storage system. In one embodiment, a sector may have a fixed size (e.g., 512 bytes) and the mapping tables may deal with ranges of sectors. For example, the address translation table may map a medium in sector-size units. The areas being mapped may be managed as ranges of sectors, with each range consisting of one or more consecutive sectors. In one embodiment, a range may be identified by <medium, start sector, length>, and this tuple may be recorded in the address translation table and medium mapping table. In one embodiment, the key value for accessing the address translation table may be the combination of the medium ID and the received sector number. A key is an entity in a mapping table that distinguishes one row of data from another row. In other embodiments, other types of address translation tables may be utilized.

In one embodiment, the address translation table may map mediums and block offsets to physical pointer values. Depending on the embodiment, a physical pointer value may be a physical address or a logical address which the storage device maps to a physical location within the device. In one embodiment, an index may be utilized to access the address translation table. The index may identify locations of mappings within the address translation table. The index may be queried with a key value generated from a medium ID and sector number, and the index may be searched for one or more entries which match, or otherwise correspond to, the key value. Information from a matching entry may then be used to locate and retrieve a mapping which identifies a storage location which is the target of a received read or write request. In one embodiment, a hit in the index provides a corresponding virtual page ID identifying a page within the storage devices of the storage system, with the page storing both the key value and a corresponding physical pointer value. The page may then be searched with the key value to find the physical pointer value.

The deduplication table may include information used to deduplicate data at a fine-grained level. The information stored in the deduplication table may include mappings between one or more calculated hash values for a given data component and a physical pointer to a physical location in one of the storage devices 135A-N holding the given data component. In addition, a length of the given data component and status information for a corresponding entry may be stored in the deduplication table. It is noted that in some embodiments, one or more levels of indirection may exist between the physical pointer value and the corresponding physical storage location. Accordingly, in these embodiments, the physical pointer may be used to access another mapping table within a given storage device of the storage devices 135A-N.

Networks 120 and 150 may utilize a variety of techniques including wireless connection, direct local area network (LAN) connections, wide area network (WAN) connections such as the Internet, a router, storage area network, Ethernet, and others. Networks 120 and 150 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in networks 120 and 150. The networks 120 and 150 may interface with a set of communications protocols used for the Internet such as the Transmission Control Protocol (TCP) and the Internet Protocol (IP), or TCP/IP.

Client computer systems 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 115 and 125 include one or more processors comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

It is noted that in alternative embodiments, the number and type of storage arrays, client computers, storage controllers, networks, storage device groups, and data storage devices is not limited to those shown in FIG. 1. At various times one or more clients may operate offline. In addition, during operation, individual client computer connection types may change as users connect, disconnect, and reconnect to system 100. Further, the systems and methods described herein may be applied to directly attached storage systems or network attached storage systems and may include a host operating system configured to perform one or more aspects of the described methods. Numerous such alternatives are possible and are contemplated.

Figure 2:
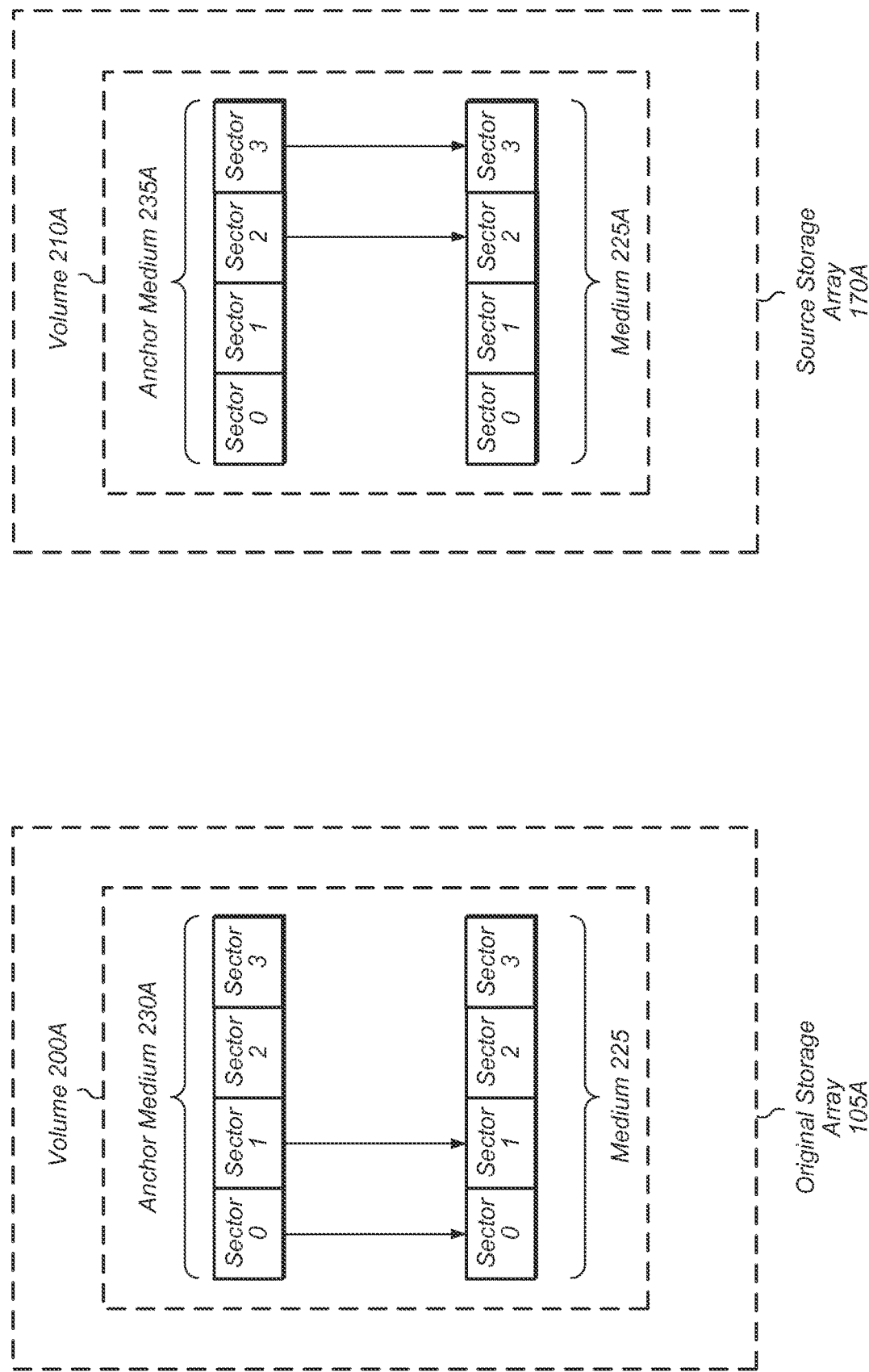
FIG. 2 is a logical block diagram illustrating one embodiment of two volumes on separate storage arrays.

Turning now to FIG. 2, a logical block diagram illustrating two volumes on separate storage arrays is shown. Volume 200A is shown on original storage array 105A and volume 210A is shown on source storage array 170A. The depiction of volume 200A illustrates the mediums which underlie volume 200A and the mappings between these mediums. For example, anchor medium 230A underlies volume 200A, and any changes to volume 200A may be recorded in anchor medium 230A. Each arrow shown in volume 200A indicates a mapping between anchor medium 230A and medium 225, with an arrow indicating that a lookup of a given sector is mapped through medium 225 rather than through anchor medium 230A. Although volume 200A and volume 210A have only two underlying mediums in their medium hierarchies, it should be understood that other volumes may have additional levels of underlying mediums. For example, in another embodiment, there may be one or more levels of mediums below medium 225 in the medium hierarchy of volume 200A.

It is noted that the medium hierarchy of a volume refers to all of the mediums which are referenced by the volume and which underlie the volume. The anchor medium of a given volume is at the top of the medium hierarchy, while the oldest medium referenced by the given volume is at the bottom of the medium hierarchy. There may be any number of levels in the medium hierarchy between the anchor medium and the oldest medium, depending on the number of snapshots which have been taken of the corresponding volume and on other factors such as medium consolidation or other volume-level operations, such as copy offload and clone.

It may be assumed for the purposes of this discussion that volume 200A and volume 210A are both children of the same medium 225. It may also be assumed for the purposes of this discussion that medium 225 was previously replicated from array 105A to array 170A, with the replica shown as medium 225A on array 170A to differentiate from the original medium 225 on array 105A. In other words, medium 225 references the same data as medium 225A, although the mappings from anchor medium 230A to medium 225 are different from the mappings from anchor medium 235A to medium 225A, as indicated by the arrows shown in FIG. 2. In one embodiment, medium 225 and medium 225A may have the same global content ID but may have separate local IDs on original storage array 105A and source storage array 170A. For example, the local ID of medium 225 on original storage array 105A may map to the global content ID 225 and the local ID of medium 225A on source storage array 105A may also map to the global content ID 225. In this way, a given storage array may be able to identify which of its mediums are also present on other storage arrays.

As shown, volume 200A has an anchor medium 230A which maps to medium 225 for sectors 0 and 1. In other words, a lookup of any blocks in these sectors of volume 200A will be mapped through medium 225. These mappings of anchor medium 230A indicate that sectors 0 and 1 of volume 200A have not been modified since a snapshot was taken of medium 225. A snapshot may be defined as the state of a logical collection of data (e.g., volume, medium, etc.) at a given point in time. Since sectors 2 and 3 of anchor medium 230A do not map to medium 225, this indicates that sectors 2 and 3 of volume 200A have been overwritten with new data since the snapshot was taken of medium 225. Therefore, sectors 2 and 3 may be mapped directly from anchor medium 230A. It is noted that the size of sectors 0-3 may vary depending on the embodiment. It is also noted that in other embodiments, volumes and mediums may have other numbers of sectors besides four.

The arrows from sectors 2 and 3 of anchor medium 235A to medium 225A indicate that these sectors of volume 210A are mapped through medium 225A. Since there are no arrows from sectors 0 and 1 of anchor medium 235 to medium 225A, this indicates that these sectors of volume 210A have been overwritten since a previous snapshot of medium 225A was taken and that a lookup of any blocks of sectors 0-1 may be mapped through anchor medium 235A.

Figure 3:
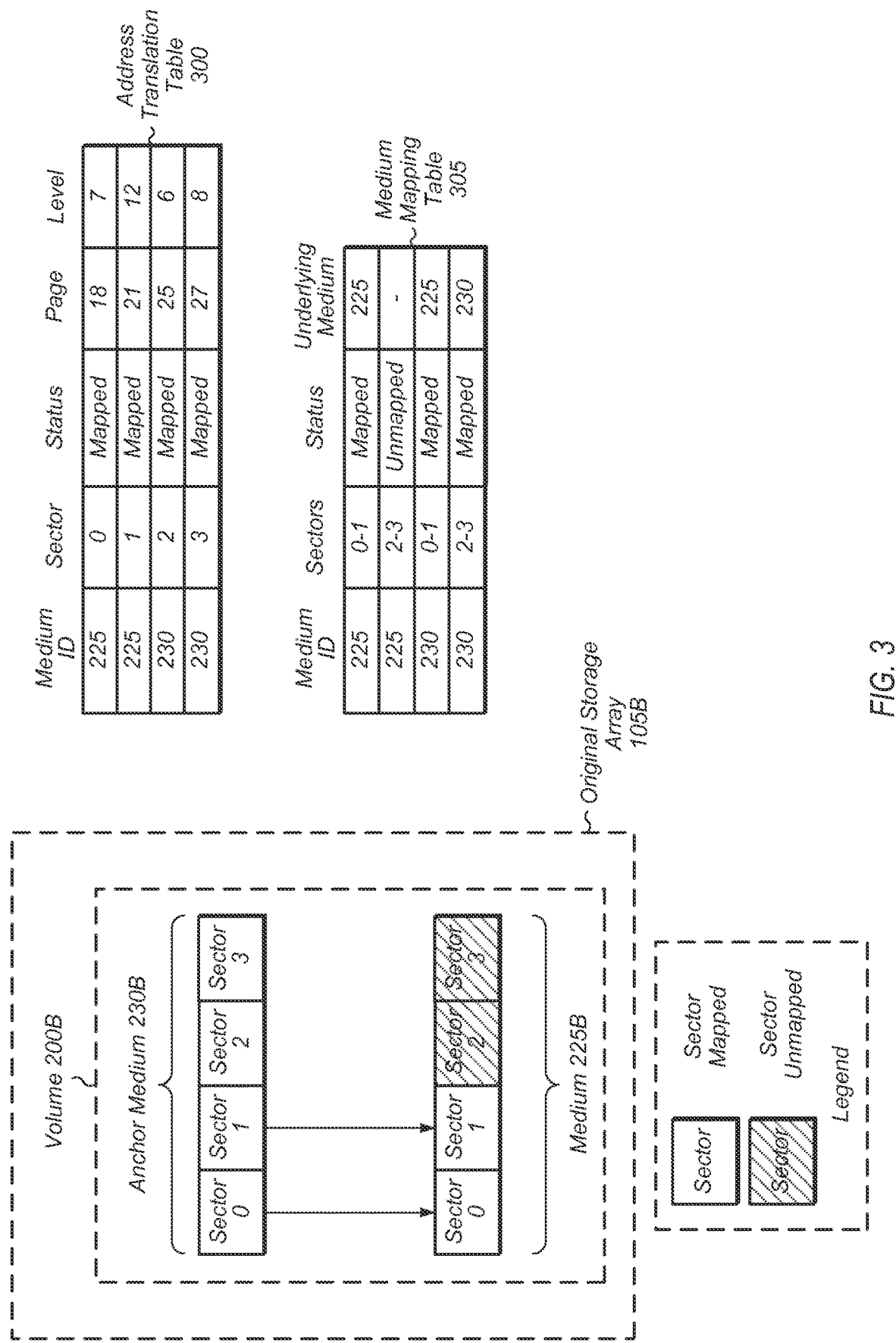
FIG. 3 is a logical block diagram illustrating one embodiment of unmapped sectors of a medium.

Referring now to FIG. 3, a logical block diagram of one embodiment of unmapped sectors of a medium are shown. Volume 200B, anchor medium 230B, medium 225B, and original storage array 105B are intended to represent volume 200A, anchor medium 230A, medium 225, and original storage array 105A (of FIG. 2), respectively, at a later point in time. Since sectors 2 and 3 of anchor medium 230B are not mapped to sectors 2 and 3 of medium 225B, sectors 2 and 3 of medium 225B may be marked as being in an unmapped state, provided that no other mediums map to these sectors. However, if a storage controller (e.g., storage controller 110 of FIG. 1) detects that any other mediums map to sectors 2 and 3 of medium 225B, then these sectors 2 and 3 may be prevented from being marked as being unmapped.

For the purposes of this discussion, it will be assumed that the storage controller has determined that no other volumes or mediums reference sectors 2 and 3 of medium 225B prior to updating the status of these sectors to unmapped. The unmapped status of sectors 2 and 3 of medium 225B indicates that these sectors previously existed but that their contents have been forgotten and/or deleted. In other words, a range of sectors may be recorded as unmapped if it is unreachable from any other mediums. In one embodiment, unmapped ranges may be prevented from being overwritten.

When sectors 2 and 3 of medium 225B are put into the unmapped state, this allows garbage collection operations to free the storage locations associated with those sectors so that these storage locations can be reused. Garbage collection may be defined as a process in which storage locations are freed and made available for reuse by the system. The unmapped sectors 2 and 3 of medium 225B are shown as sectors with diagonal lines in FIG. 3 to indicate their unmapped status. In one embodiment, the unmapped status of sectors 2-3 of medium 225B may be recorded in medium mapping table 305. It is noted that in other embodiments, the unmapped status of sectors 2 and 3 of medium 225B may be indicated in corresponding entries of address translation table 300.

It is noted that although address translation table 300 is shown as having a separate entry for each sector of mediums 225 and 230, in other embodiments, each entry of address translation table 300 may correspond to a variable range size which is an integral number of sectors. It should be understood that the entries of address translation table 300 and medium mapping table 305 show only pertinent attributes to avoid cluttering the figure. In other embodiments, address translation table 300 and medium mapping table 305 may be organized in a different manner and/or may include other information. It is noted that any suitable data structure may be used to store the mapping table information of medium mapping table 305 in order to provide for efficient searches (e.g., b-trees, binary trees, hash tables, etc.). All such data structures are contemplated.

In one embodiment, attributes from a matching entry of address translation table 300 may be used to locate and retrieve a mapping in a corresponding translation table (not shown). In one embodiment, a hit in address translation table 300 provides a corresponding level ID and page ID identifying a level and page within the translation table storing both the key value and a corresponding physical pointer value. The page identified by the corresponding page ID may be searched with the key value so as to retrieve the corresponding pointer. The pointer may be used to identify or locate data stored in the storage devices of the storage system. It is noted that in various embodiments, the storage system may include storage devices (e.g., SSDs) which have internal mapping mechanisms. In such embodiments, the pointer in a translation table entry may not be an actual physical address per se. Rather, the pointer may be a logical address which the storage device maps to a physical location within the device.

Determining where to record the unmapped status of sectors 2 and 3 of medium 225B may be based on a variety of factors, including the size of the unmapped sectors, the locations of the endpoints of the unmapped sectors, the size of the medium mapping table, the ratio of the size of the address translation table in relation to the size of the medium mapping table, and/or one or more other factors. In one embodiment, the storage controller may be configured to minimize the size of medium mapping table 305, and therefore the preference may be to store entries for unmapped portions of mediums in address translation table 300. In another embodiment, the storage controller may be configured to store the entries indicating "unmapped" in medium mapping table 305. In a further embodiment, both techniques may be used in the same system, with the storage controller dynamically choosing which approach to use for a given mapping.

Figure 4:
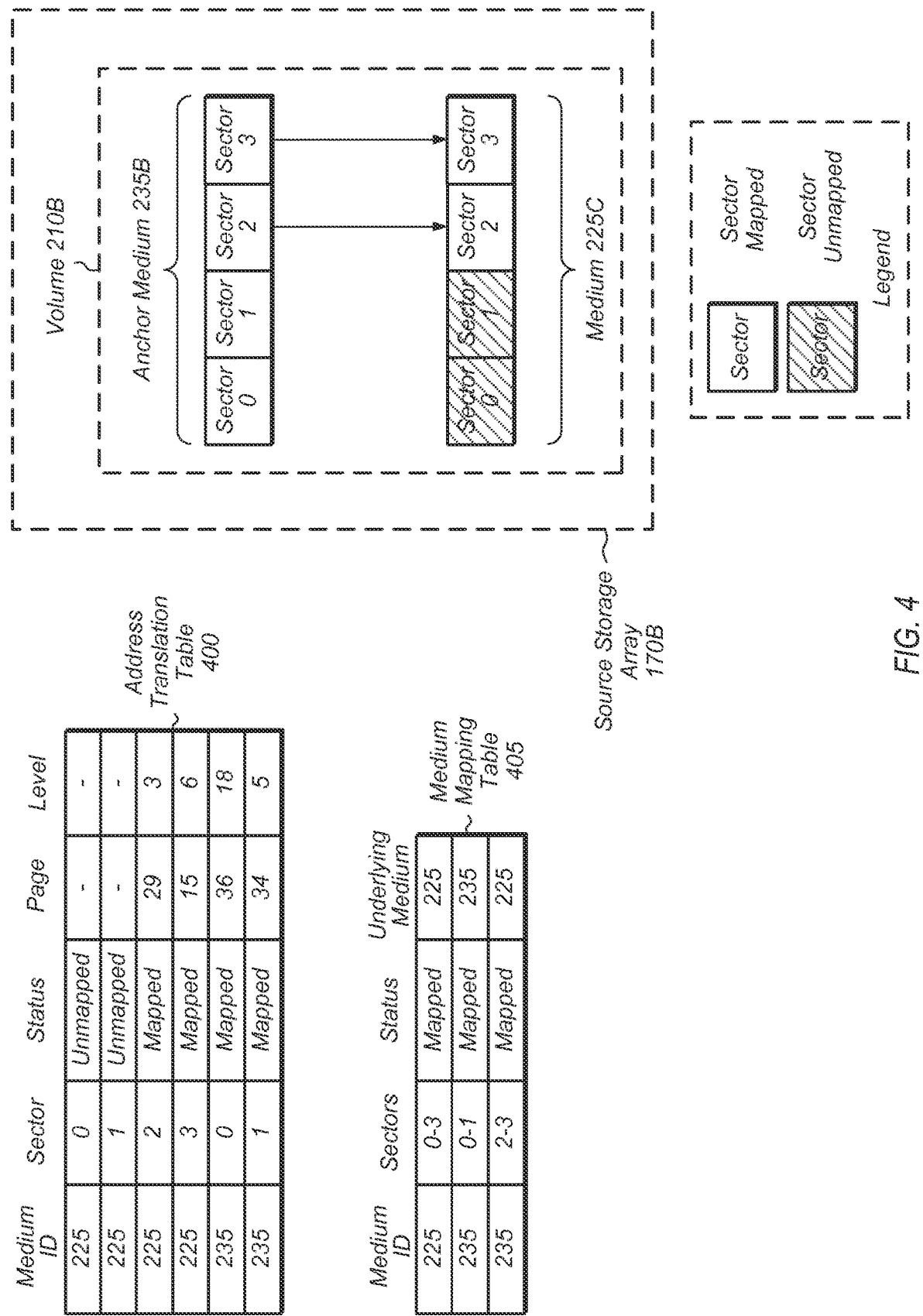
FIG. 4 illustrates a logical block diagram of one embodiment of a volume and corresponding address translation table and medium mapping table entries.

Turning now to FIG. 4, a logical block diagram of a volume and corresponding address translation table and medium mapping table entries are shown. The examples shown in FIG. 4 are intended to be a continuation of the discussion regarding FIG. 2. Accordingly, source storage array 170B, volume 210B, anchor medium 235B, and medium 225C are intended to represent source storage array 170A, volume 210A, anchor medium 235A, and medium 225A (of FIG. 2), respectively, at a later point in time.

A storage controller of source storage array 170B may detect that sectors 0 and 1 of anchor medium 235B do not map to sectors 0 and 1 of medium 225C. The storage controller may detect this when sectors 0 and 1 of anchor medium 235B are overwritten. Alternatively, the storage controller may detect that sectors 0 and 1 of anchor medium 235B do not map to sectors 0 and 1 medium 225C while performing read optimization operations.

In addition to detecting that sectors 0 and 1 of anchor medium 235B no longer map to sectors 0 and 1 of medium 225C, the storage controller may also determine if any other mediums map to sectors 0 and 1 of medium 225C. In response to detecting that sectors 0 and 1 of medium 225C are unreachable from any other mediums, the storage controller may put sectors 0 and 1 of medium 225C in the unmapped state. The storage controller may record that sectors 0 and 1 of medium 225C are unmapped as shown in the first two entries of address translation table 400. By marking sectors 0 and 1 of medium 225C as unmapped, garbage collection operations may then reclaim the storage locations corresponding to those sectors.

In one embodiment, the storage controller may maintain a single entry for medium 225C in medium mapping table 405 which indicates that the entire medium is in the mapped state. However, a lookup of address translation tables 400 for sectors 0 and 1 of medium 225C will result in a hit to the entries in the unmapped state. By recording the unmapped status of sectors 0 and 1 in the address translation table 400 rather than in medium mapping table 405, the fragmentation of medium mapping table 405 is reduced. However, it is noted that in another embodiment, the storage controller could record the unmapped status of sectors 0 and 1 of medium 225 in medium mapping table 405 rather than in address translation table 400.

Figure 5:
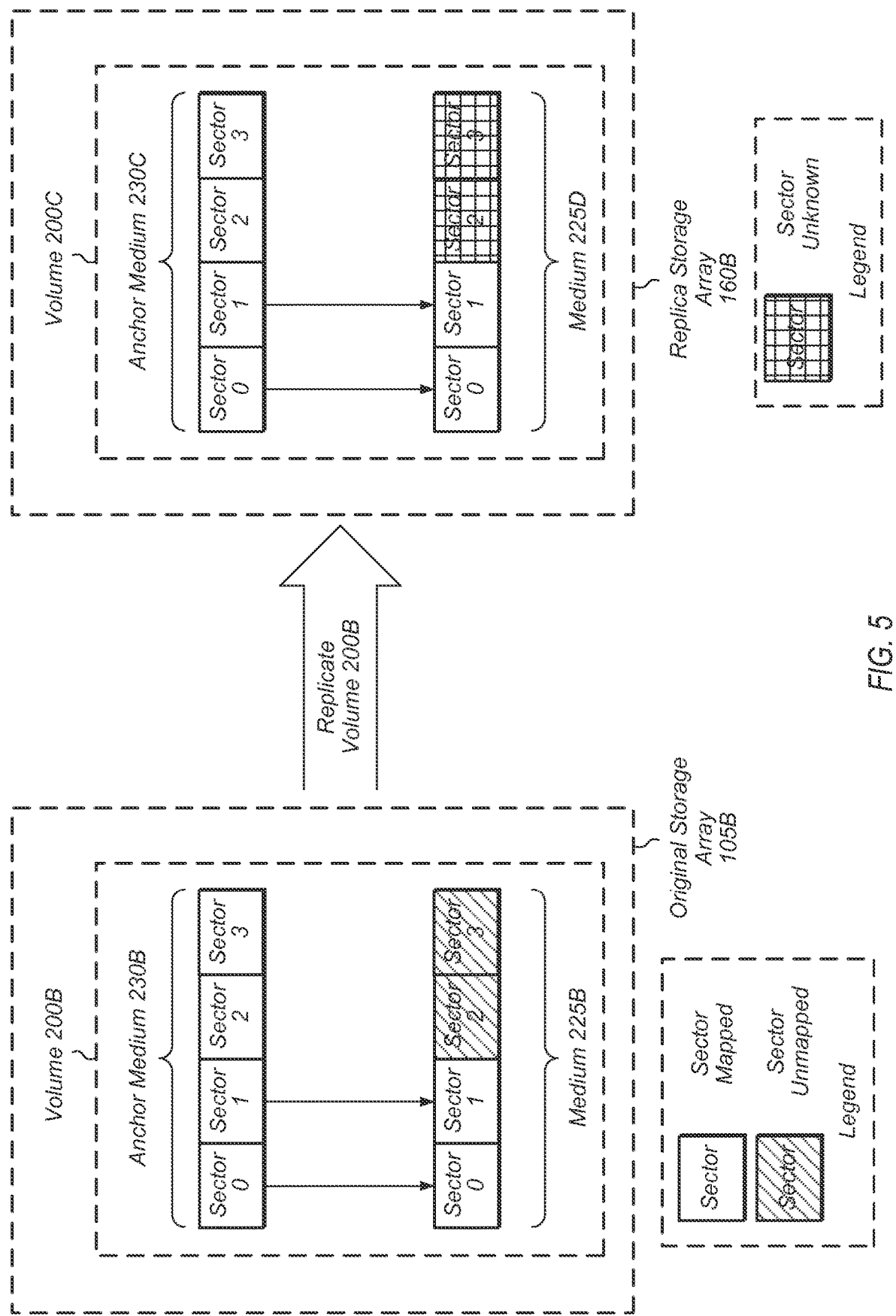
FIG. 5 is a logical block diagram of one embodiment of a volume being replicated.

Referring now to FIG. 5, a logical block diagram of a volume being replicated is shown. It may be assumed for the purposes of this discussion that a request to replicate volume 200B from original storage array 105B to replica storage array 160B has been detected. As a result, volume 200B may be replicated to replica storage array 160B. The replicated copy of volume 200B is shown as volume 200C on replica storage array 160B.

When replicating volume 200B to replica storage array 160B, the unmapped sectors 2-3 of medium 225B may be translated into unknown sectors 2-3 of medium 225D of replicated volume 200C. The unknown status of sectors 2-3 of medium 225D indicates that replica storage array 160B knows that these sectors 2-3 of medium 225D previously existed but that replica storage array 160B does not have the content of these sectors. Also, the unknown status indicates that the contents of these sectors may be filled in at a later point in time if the contents become available through another source.

Figure 6:
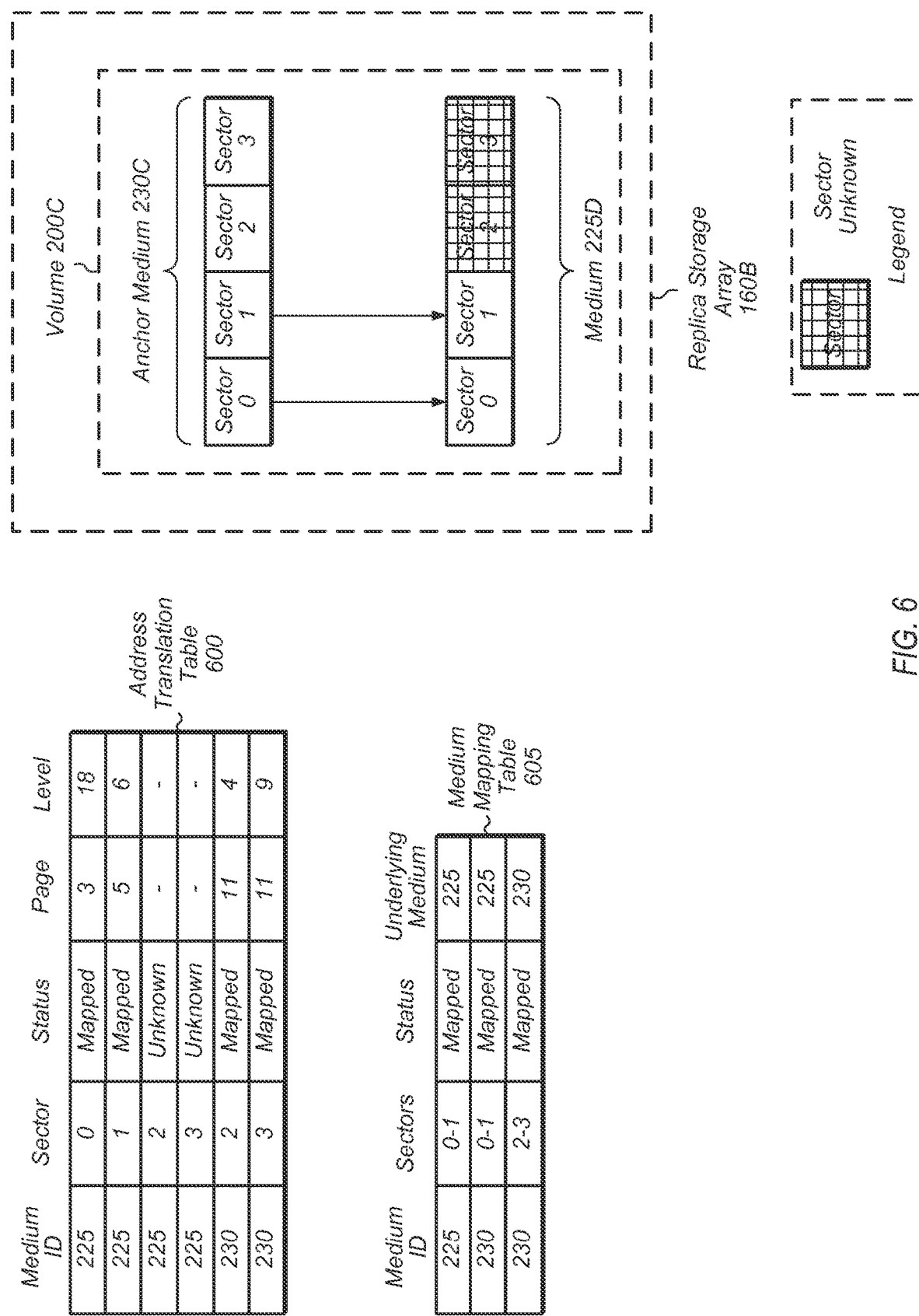
FIG. 6 is a logical block diagram of one embodiment of a replicated volume and corresponding address translation table and medium mapping table entries.

Turning now to FIG. 6, a logical block diagram of one embodiment of a replicated volume along with address translation and medium mapping tables are shown. FIG. 6 is intended to be a continuation of the discussion of the replicated volume 200C shown in FIG. 5. As shown in FIG.

6, replica storage array 160B stores the replicated volume 200C, which includes anchor medium 230C and medium 225D, with sectors 2 and 3 of medium 225D shown as being in an unknown state.

In one embodiment, the unknown state of sectors 2 and 3 of medium 225 may be recorded in address translation table 600. This is shown in the middle two entries of address translation table 600. However, in another embodiment, the unknown state of sectors 2 and 3 of medium 225 could also be recorded in medium mapping table 605, although this is not shown in FIG. 6.

It should be understood that address translation table 600 and medium mapping table 605 are examples of tables that may be utilized in one embodiment. In other embodiments, tables 600 and 605 may be organized differently and/or may include other information. It is noted that medium 225D may have a local medium ID which is specific to replica storage array 160B. However, this local medium ID may be mapped (via a separate table) to a global medium ID which identifies medium 225D as being the same as medium 225B of original storage array 105B. Alternatively, the medium IDs recorded in tables 800 and 805 may be global content IDs that uniquely the mediums across multiple arrays.

Figure 7:
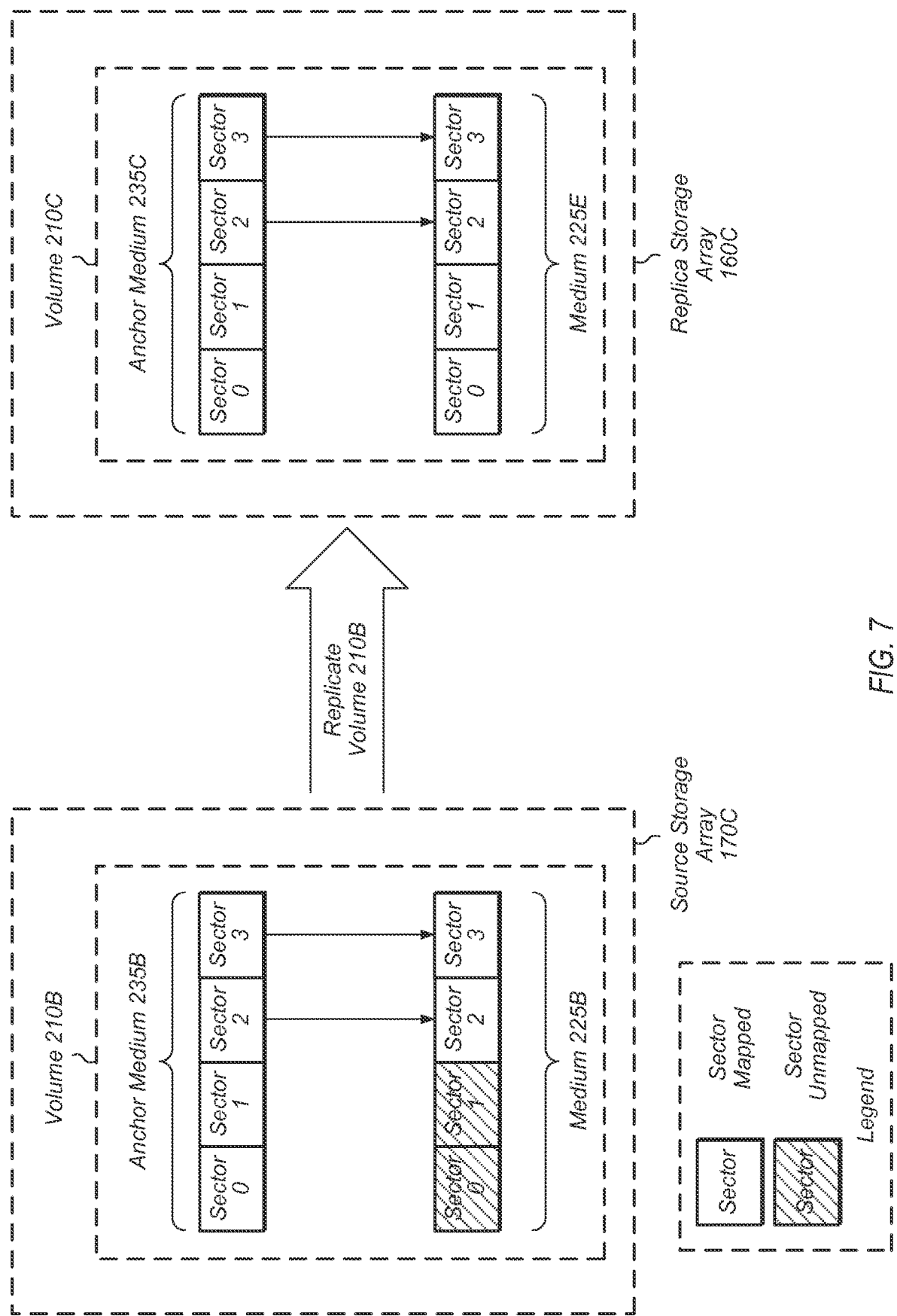
FIG. 7 is a logical block diagram of another embodiment of replicating a volume.

Turning now to FIG. 7, a logical block diagram of another embodiment of replicating a volume is shown. FIG. 7 is intended to illustrate a continuation of the discussion regarding FIG. 6. Accordingly, replica storage array 160C and medium 225E are intended to represent replica storage array 160B and medium 225D (of FIG. 6), respectively, at a later point in time. Also, volume 210C and anchor medium 235C on replica storage array 160C are intended to represent the replicated versions of volume 210B and anchor medium 235B, respectively, of source storage array 170C.

When volume 210B is replicated from source storage array 170C to replica storage array 160C, the previously unknown sectors 2-3 of medium 225D (of FIG. 6) may be filled in with the actual data of these sectors from medium 225B of source storage array 170C. Therefore, the contents corresponding to sectors 2-3 may be replicated to replica storage array 160C, and the status of sectors 2-3 of anchor medium 225E may be changed from unknown to mapped.

Figure 8:
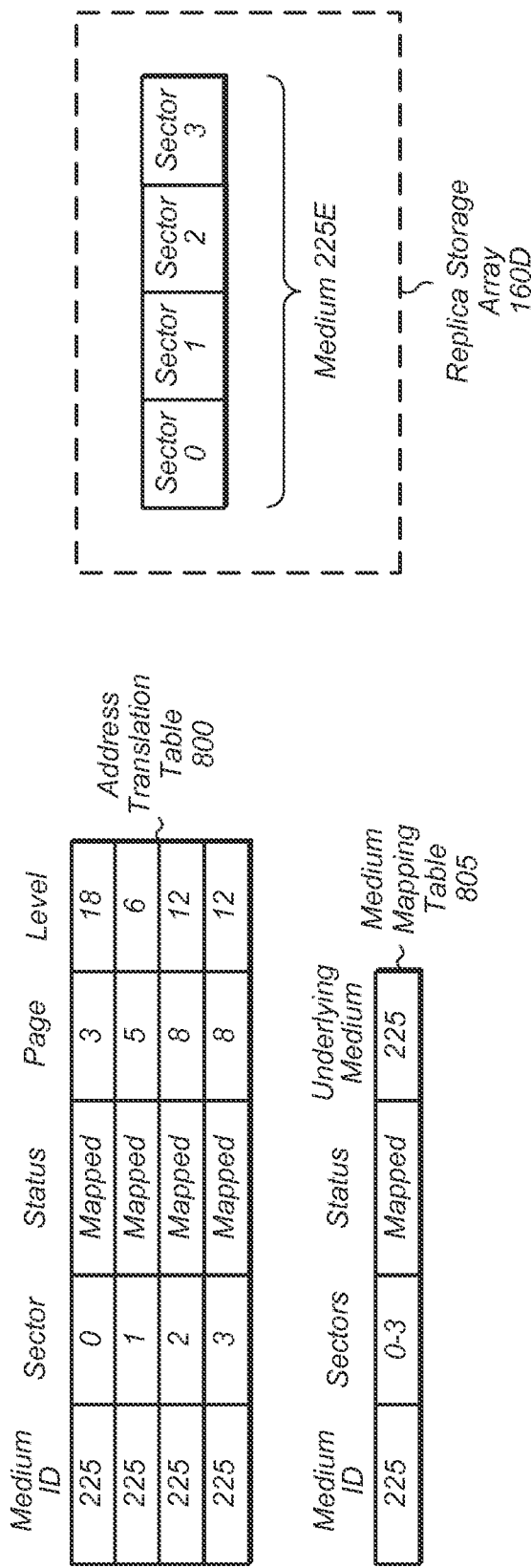
FIG. 8 is a logical block diagram of one embodiment of a replicated medium on a replica storage array.

Turning now to FIG. 8, a logical block diagram of one embodiment of a replicated medium on a replica storage array is shown. FIG. 8 is intended to illustrate a continuation of the discussion from FIG. 7. Accordingly, replica storage array 160D is intended to represent replica storage array 160C (of FIG. 7) at a later point in time. While only medium 225E is shown within the dashed box of replica storage array 160D, it should be understood that replica storage array 160D may include any number of other mediums and volumes, which are not shown to avoid cluttering the figure.

After volume 210B is replicated from source storage array 170C to replica storage array 160C (as shown in FIG. 7), the previously unknown sectors 2-3 of medium 225D (of FIG. 6) may be filled in with the actual data of these sectors from source storage array 170C. Therefore these sectors 2-3 now have a status of mapped as indicated in the bottom two entries of address translation table 800 and the single entry of medium mapping table 805.

Figure 9:
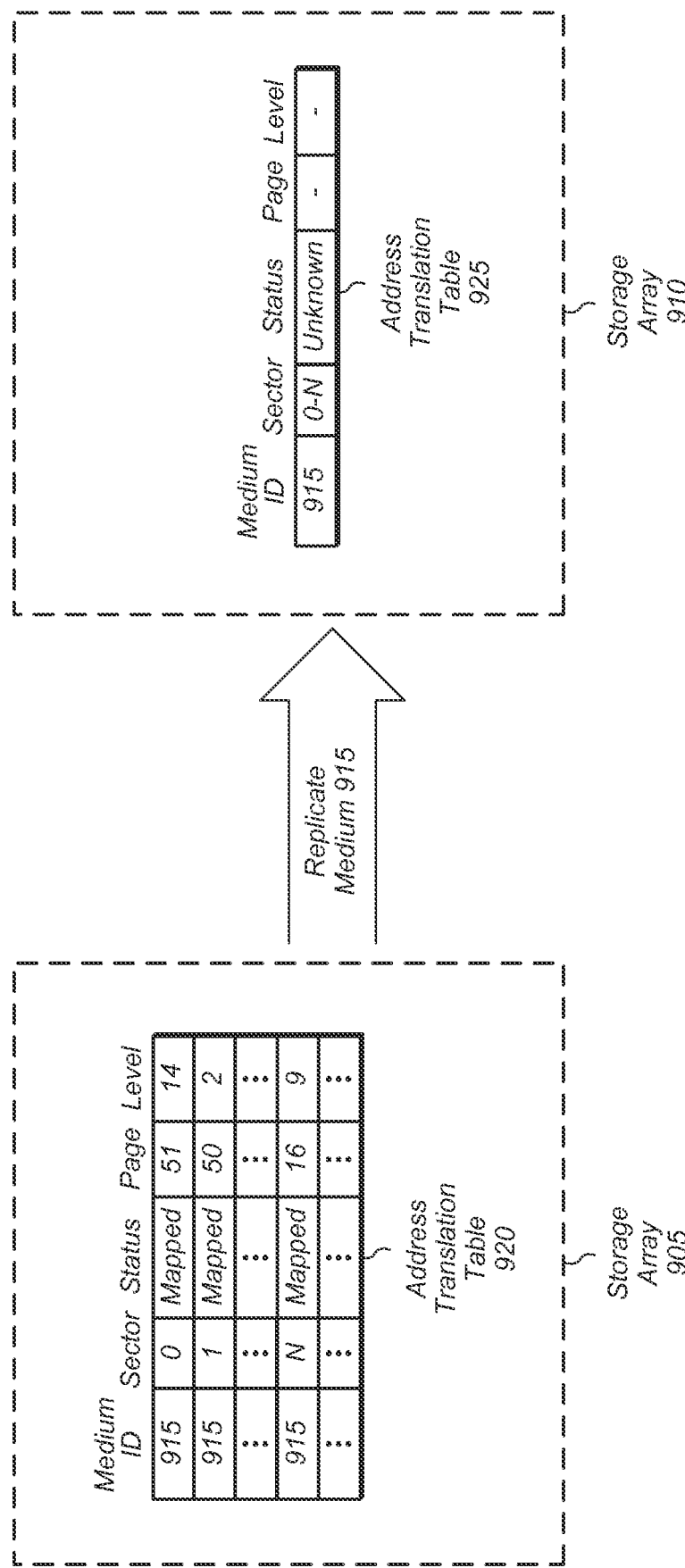
FIG. 9 is a logical block diagram of one embodiment of replicating using unknown tuples.

Referring now to FIG. 9, a logical block diagram of one embodiment of replicating using unknown tuples is shown. For the purposes of this discussion, it may be assumed that medium 915 has been selected for replication from storage array 905 to storage array 910. It may also be assumed that medium ID 915 has 'N' sectors, wherein 'N' is a positive integer, and address translation table 920 may have up to 'N' entries that cover the 'N' sectors of medium 915. It is noted that storage array 905 may include any number of other mediums (and volumes) in addition to medium 915.

In one embodiment, once a dataset (e.g., volume, medium, virtual machine) has been selected for replication, an unknown tuple for the entire dataset may be sent from storage array 905 to storage array 910. Alternatively, storage array 910 may create a new unknown tuple locally on storage array 910 for the entire dataset. At a later point in time, the actual content of the dataset may be replicated to storage array 910, and new tuples (with a state of mapped) may be created for the dataset's contents.

As shown in address translation table 925, an unknown tuple is used to represent the entire medium 915 prior to sending any of the actual contents of medium 915 to storage array 910. Medium 915 may then be exposed to user operations prior to replicating the data of medium 915 to storage array 910. As described herein, a tuple may include one or more data fields including a pointer used to identify or locate stored data components. A tuple may also include a status indicator, and in one embodiment, the status indicator may be set to one of the following values: mapped, unmapped, or unknown. In some embodiments, an entry in an address translation table may be referred to as a tuple.

Once one or more unknown tuples are sent to or are created on storage array 910 for the dataset being replicated, the corresponding content may be exposed to the user. Accordingly, the dataset being replicated may be exposed to the user prior to the actual data being replicated from storage array 905 to storage array 910. If a read operation targets one of the unknown tuples, then storage array 910 may retrieve the corresponding data from storage array 905 to process the user request. Then, when the data for a given unknown tuple is stored on storage array 910, the state of the tuple may be changed to mapped.

In this way, storage array 910 can expose data to users while the data is still being copied over from storage array 905. For example, in one embodiment, an organization or company may have a failure of an existing storage array, and storage array 910 may be used to bring back data during the recovery process. Storage array 910 may first create or receive the unknown tuples prior to retrieving the actual data from one or more other storage arrays. For example, in one embodiment, storage array 905 may first transfer an unknown tuple for the entire medium 915, and then contents of medium 915 may start getting filled in after that. When operations that target missing data are detected, the operations will hit the unknown tuples, and then storage array 910 can go through the network (not shown) and get the data from other sources (e.g., storage array 905). In this way, the unknown tuple(s) may serve as a form of indirection for storage array 910 prior to the retrieval of all of the corresponding data.

Figure 10:
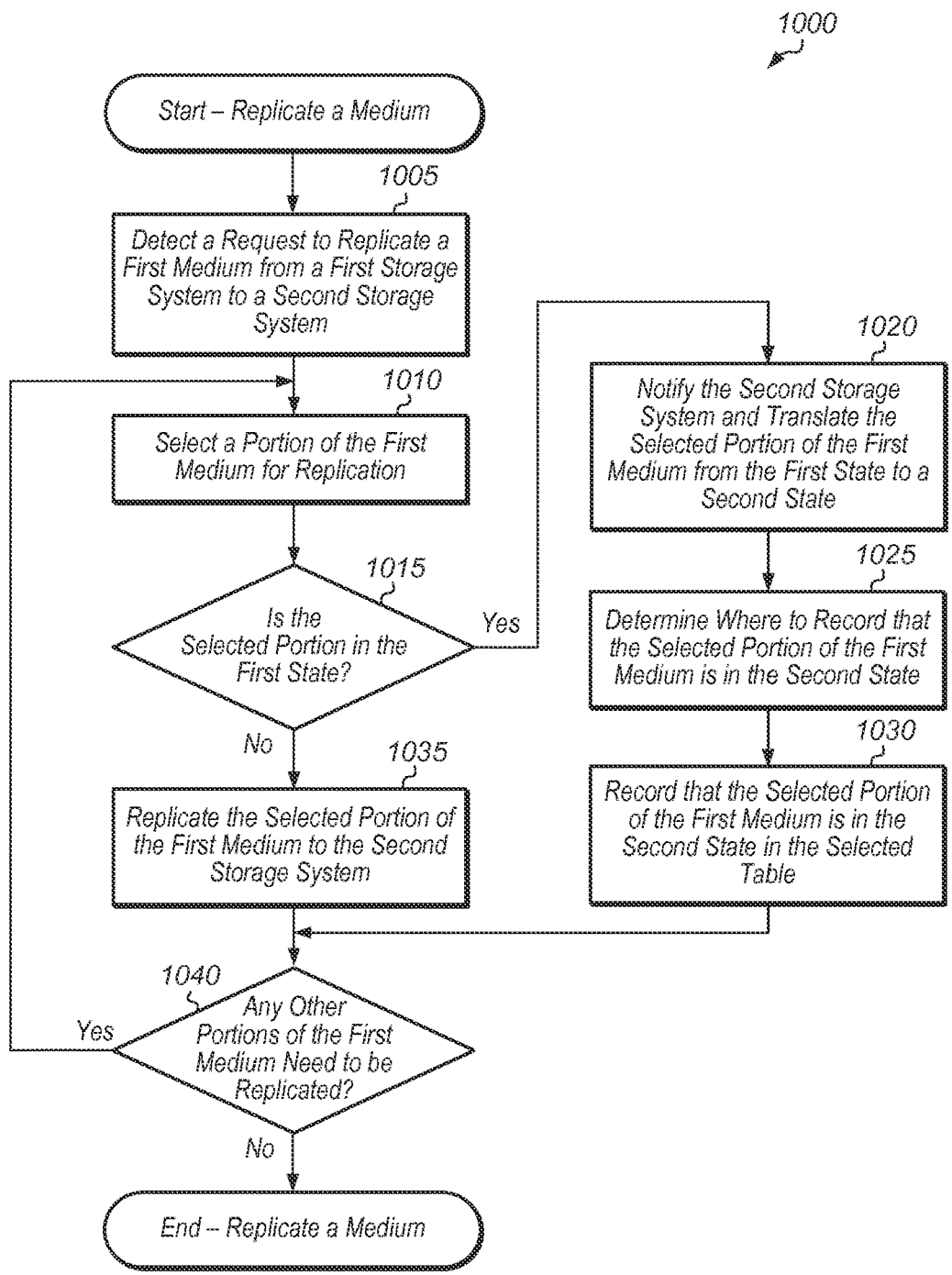
FIG. 10 is a generalized flow diagram illustrating one embodiment of a method for replicating a medium.

Turning now to FIG. 10, one embodiment of another method for replicating a medium from a first storage system to a second storage system is shown. The components embodied in system 100 described above (e.g., storage controller 110) may generally operate in accordance with method 1000. In addition, the steps in this embodiment are shown in sequential order. However, some steps may occur in a different order than shown, some steps may be performed concurrently, some steps may be combined with other steps, and some steps may be absent in another embodiment.

A request to replicate a first medium from a first storage system to a second storage system may be detected (block 1005). It is noted that the first and second storage systems may be storage arrays in one embodiment. In response to selecting the first medium for replication, a first portion of the first medium may be selected for replication (block 1010). The size of the first portion may vary according to the embodiment. Then, the storage controller on the first storage system may determine if the selected portion is in a first state (conditional block 1015). In one embodiment, the first state may be the unmapped state.

If the selected portion of the first medium is in the first state (conditional block 1015, "yes" leg), then the first storage system may notify the second storage system and a storage controller of the second storage system may translate the status of the selected portion from the first state to a second state (block 1020). In one embodiment, the second state may be the unknown state. While the selected portion of the first medium may be recorded as unknown, this portion may be filled in at a later point in time if a third storage system has the contents of the selected portion of the first medium and sends the selected portion of the first medium to the second storage system.

Next, the storage controller may determine where to record that the selected portion of the first medium is in the second state (block 1025). In one embodiment, the storage controller may have the option of recording that the selected portion of the first medium is in the second state in either a first table or a second table. In one embodiment, the first table may be an address translation table and the second table may be a medium mapping table. The storage controller may select the first or second table based on any of various factors, including the size of the selected portion, the location of the endpoints of the selected portion, the size of the first table, the size of the second table, the size of the first table in relation to the second table, and/or other factors.

For example, in one embodiment, the storage controller may compare the size of the selected portion to a first programmable threshold. If the size of the selected portion is less than the first programmable threshold, then the storage controller may select the first table. Otherwise, if the size of the selected portion is greater than the first programmable threshold, then the storage controller may select the second table. Alternatively, in another embodiment, the storage controller may determine where to record that the selected portion of the first medium is in the second state based on locations of endpoints of the selected portion. In this embodiment, the storage controller may select the first table responsive to determining the endpoints of the selected portion are not on sector boundaries. Otherwise, if the endpoints are on sector boundaries, then the storage controller may select the second table.

In a further embodiment, the storage controller may determine where to record that the selected portion of the first medium is in the second state based on the size of the second table. For example, if the size of the second table is greater than a second programmable threshold, then the storage controller may select the first table. Otherwise, if the size of the second table is less than the second programmable threshold, then the storage controller may select the second table. In a still further embodiment, the storage controller may determine which table to select based on a comparison between the relative sizes of the first table and the second table. For example, the storage controller may attempt to keep the ratio of the size of the first table compared to the second table at or below a third programmable threshold (e.g., 100, 1000). Accordingly, if the size of the first table divided by the size of the second table is greater than the third programmable threshold, the storage controller may select the second table. Otherwise, if the size of the first table divided by the size of the second table is less than the third programmable threshold, the storage controller may select the first table. It is noted that any two or more of the above-described techniques may be combined into a single scheme for deciding where to record that the selected portion of the first medium is in the second state.

After selecting a table in block 1025, the storage controller may record that that the selected portion of the first medium is in the second state in the selected table (block 1030). It is noted that while the storage controller records that the selected portion of the first medium is in the second state on the second storage system, the selected portion of the first medium may remain in the first state on the first storage system. After block 1030, the storage controller on the first storage system may determine if there are any other portions of the first medium that have not yet been processed as part of the replication process (conditional block 1040).

If the selected portion of the first medium is not in the first state (conditional block 1015, "no" leg), then the selected portion may be replicated from the first storage system to the second storage system (block 1035). Next, the storage controller on the first storage system may determine if there are any other portions of the first medium that have not yet been processed as part of the replication process (conditional block 1040). If there are any other portions of the first medium that have not yet been processed as part of the replication process (conditional block 1040, "yes" leg), then method 1000 may return to block 1010 to select the next portion of the first medium for replication. If all portions of the first medium have already been replicated (conditional block 1040, "no" leg), then method 1000 may end.

Figure 11:
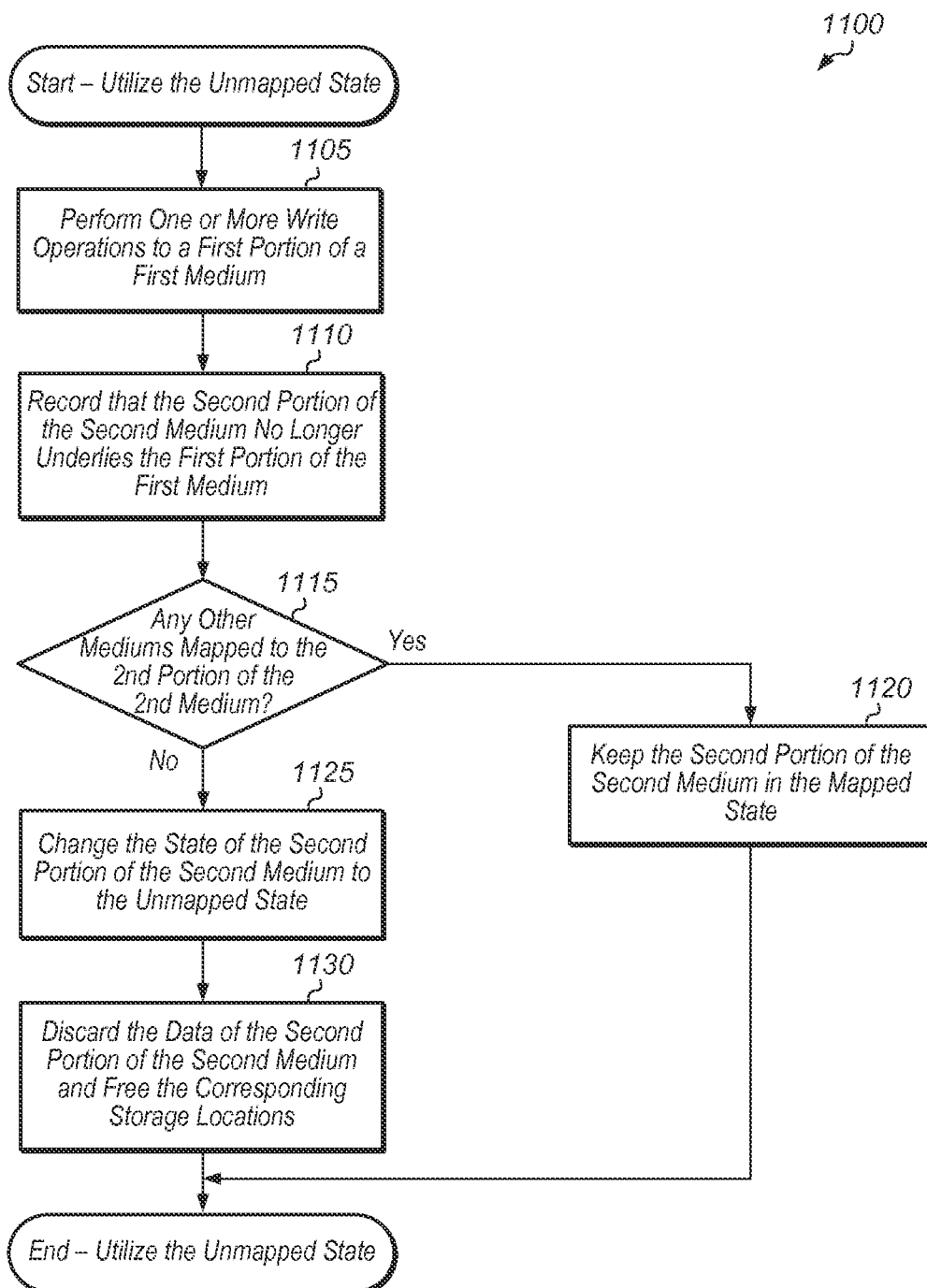
FIG. 11 is a generalized flow diagram illustrating one embodiment of a method for utilizing the unmapped state.

Referring now to FIG. 11, one embodiment of a method 1100 for utilizing an unmapped state is shown. The components embodied in system 100 described above (e.g., storage controller 110) may generally operate in accordance with method 1100. In addition, the steps in this embodiment are shown in sequential order. However, some steps may occur in a different order than shown, some steps may be performed concurrently, some steps may be combined with other steps, and some steps may be absent in another embodiment.

A storage controller may perform one or more write operations to a first portion of a first medium (block 1105). It may be assumed for the purposes of this discussion that prior to performing the write operation(s) to the first portion of the first medium, the first portion of the first medium was mapped to a second portion of a second medium. In other words, the second portion of the second medium was underlying the first portion of the first medium.

Responsive to performing the write operation(s) to the first portion of the first medium, the storage controller may record that the second portion of the second medium no longer underlies the first portion of the first medium (block 1110). Next, the storage controller may determine if any other portions of any other mediums are mapped to the second portion of the second medium (conditional block 1115). In other words, the storage controller may determine if the second portion of the second medium underlies any other mediums.

If the storage controller detects that one or more portions of other mediums are mapped to the second portion of the second medium (conditional block 1115, "yes" leg), then the second portion of the second medium may remain in the mapped state (block 1120). However, if the storage controller detects that no other portions of any other mediums are mapped to the second portion of the second medium (conditional block 1115, "no" leg), then the storage controller may change the state of the second portion of the second medium to the unmapped state (block 1125). Once the second portion of the second medium is recorded as being unmapped, the data of the second portion of the second medium may be discarded and the corresponding storage locations may be freed and reused (block 1130). After blocks 1120 and 1130, method 1100 may end.

It is noted that the above-described embodiments may comprise software. In such an embodiment, the program instructions that implement the methods and/or mechanisms may be conveyed or stored on a non-transitory computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
    detecting, by a target storage system, that a dataset referenced by one or more identifiers will be replicated from a source storage system to the target storage system;
    exposing, by the target storage system, the dataset for user operations prior to receiving the entire dataset;
    receiving, by the target storage system, a request to read a portion of the dataset that has not been received by the target storage system; and
    retrieving, by the target storage system, the portion of the dataset from a storage system other than the source storage system using the one or more identifiers.

2. The method of claim 1 wherein the request to read a portion of the dataset is received from a host computing device, the method further comprising sending, from the target storage system to the host computing device, the portion of the dataset.

3. The method of claim 2 wherein the portion of the dataset is sent from the target storage system to the host computing device prior to the entire dataset being replicated from the source storage system to the target storage system.

4. The method of claim 1 wherein retrieving the portion of the dataset further comprises the target storage system retrieving the portion of the dataset from the source storage system.

5. The method of claim 4 further comprising storing, within storage resources that are included in the target storage system, the portion of the dataset retrieved from the source storage system.

6. The method of claim 5 further comprising updating metadata associated with the dataset and maintained by the target storage system to indicate that the target storage system contains the portion of the dataset.

7. An apparatus that includes a computer memory and a computer processor, the computer memory including computer program instructions that, when executed by the computer processor, cause the apparatus to carry out the steps of:
    detecting that a dataset referenced by one or more identifiers will be replicated from a source storage system to a target storage system;
    exposing the dataset for user operations prior to receiving the entire dataset;
    receiving a request to read a portion of the dataset that has not been received by the target storage system; and
    retrieving the portion of the dataset from a storage system other than the source storage system using the one or more identifiers.

8. The apparatus of claim 7 wherein the request to read a portion of the dataset is received from a host computing device, the apparatus further comprising computer program instructions that, when executed by the computer processor, cause the apparatus to carry out the step of sending, from the target storage system to the host computing device, the portion of the dataset.

9. The apparatus of claim 8 wherein the portion of the dataset is sent from the target storage system to the host computing device prior to the entire dataset being replicated from the source storage system to the target storage system.

10. The apparatus of claim 7 wherein retrieving the portion of the dataset further comprises the target storage system retrieving the portion of the dataset from the source storage system.

11. The apparatus of claim 10 further comprising computer program instructions that, when executed by the computer processor, cause the apparatus to carry out the step of storing, within storage resources that are included in the target storage system, the portion of the dataset retrieved from the source storage system.

12. The apparatus of claim 11 further comprising computer program instructions that, when executed by the computer processor, cause the apparatus to carry out the step of updating metadata associated with the dataset and maintained by the target storage system to indicate that the target storage system contains the portion of the dataset.

13. A non-transitory computer readable storage medium storing program instructions, wherein the program instructions are executable by a processor for:
    detecting that a dataset referenced by one or more identifiers will be replicated from a source storage system to a target storage system;
    exposing the dataset for user operations prior to receiving the entire dataset;
    receiving a request to read a portion of the dataset that has not been received by the target storage system; and
    retrieving the portion of the dataset from a storage system other than the source storage system using the one or more identifiers.

14. The non-transitory computer readable storage medium as recited in claim 13 wherein the request to read a portion of the dataset is received from a host computing device, the non-transitory computer readable storage medium further comprising program instructions that are executable by a processor for sending, from the target storage system to the host computing device, the portion of the dataset.

15. The non-transitory computer readable storage medium as recited in claim 14 wherein the portion of the dataset is sent from the target storage system to the host computing device prior to the entire dataset being replicated from the source storage system to the target storage system.

16. The non-transitory computer readable storage medium as recited in claim 13 wherein retrieving the portion of the dataset further comprises the target storage system retrieving the portion of the dataset from the source storage system.

17. The non-transitory computer readable storage medium as recited in claim 13 wherein the program instructions are further executable by a processor for storing, within storage resources that are included in the target storage system, the portion of the dataset retrieved from the source storage system.

18. The non-transitory computer readable storage medium as recited in claim 13 wherein the program instructions are further executable by a processor for updating metadata associated with the dataset and maintained by the target storage system to indicate that the target storage system contains the portion of the dataset.

\* \* \* \* \*